(12) United States Patent
Saada et al.

(10) Patent No.: US 6,493,555 B2
(45) Date of Patent: *Dec. 10, 2002

(54) METHOD OF IMPROVING COOPERATION BETWEEN ENTITIES DURING CALL HANDOVER

(75) Inventors: Stéphane Saada, Fontenay-Sous-Bois (FR); Michael Roberts, Neuilly-sur-Seine (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/199,194

(22) Filed: Nov. 25, 1998

(65) Prior Publication Data

US 2002/0164985 A1 Nov. 7, 2002

(30) Foreign Application Priority Data

Nov. 27, 1997 (FR) .............................. 97 14912

(51) Int. Cl.⁷ ................................. H04Q 7/20
(52) U.S. Cl. ................. 455/438; 455/525; 455/436
(58) Field of Search ................. 455/436, 438, 455/439, 525, 421, 62, 63, 560; 370/321

(56) References Cited

U.S. PATENT DOCUMENTS

| | | | | |
|---|---|---|---|---|
| 4,718,081 A | | 1/1988 | Brenig ...................... | 455/438 |
| 4,821,034 A | * | 4/1989 | Anderson et al. ........... | 370/380 |
| 5,345,499 A | * | 9/1994 | Benveniste ................ | 455/449 |
| 5,509,051 A | | 4/1996 | Barnett et al. ............. | 455/443 |
| 5,623,535 A | * | 4/1997 | Leung et al. ............... | 455/444 |
| 5,640,678 A | * | 6/1997 | Ishikawa et al. ............ | 455/449 |
| 5,673,307 A | | 9/1997 | Holland et al. ............. | 455/436 |
| 5,907,808 A | * | 5/1999 | Vaara et al. ............... | 455/441 |
| 5,915,221 A | * | 6/1999 | Sawyer et al. ............. | 455/438 |
| 5,937,019 A | * | 8/1999 | Padovani .................. | 455/438 |
| 5,956,641 A | * | 9/1999 | Bruckert et al. ............ | 455/439 |
| 6,006,093 A | * | 12/1999 | Aalto et al. ................ | 455/443 |
| 6,038,449 A | * | 3/2000 | Corriveau et al. .......... | 455/436 |
| 6,058,302 A | * | 5/2000 | Westerberg ................ | 455/426 |
| 6,061,337 A | * | 5/2000 | Light et al. ................ | 455/440 |
| 6,131,029 A | * | 10/2000 | Roberts .................... | 455/438 |
| 6,157,838 A | * | 12/2000 | Di Huo et al. ............. | 455/439 |

FOREIGN PATENT DOCUMENTS

| | | |
|---|---|---|
| DE | 196 15 955 A1 | 12/1996 |
| FR | 2 720 887 A1 | 12/1995 |
| WO | WO 97/44984 | 11/1997 |

* cited by examiner

*Primary Examiner*—Vivian Chin
*Assistant Examiner*—Eliseo Ramos-Feliciano
(74) *Attorney, Agent, or Firm*—Sughrue Mion, PLLC

(57) ABSTRACT

A method of improving co-operation between entities in a cellular mobile radio communications network, wherein during inter-cell call handover, a new server cell is chosen from a set of candidate cells as being a candidate cell to which a requested handover is possible, and candidate cells to which a requested handover is not possible are referred to as rejected cells. When executing an external call handover from a current server cell controlled by a current server entity to a new server cell chosen from the set of candidate cells and controlled by a new server entity which is distinct from the current server entity, the new server entity is informed of any previously rejected cells.

6 Claims, 4 Drawing Sheets

METHOD OF IMPROVING COOPERATION BETWEEN ENTITIES DURING CALL HANDOVER

The present invention relates generally to cellular mobile radiocommunications systems, more particularly to managing radio resources in such systems, and even more particularly to managing radio resources in such systems while handing over a call between cells (referred to as "inter-cell call handover").

BACKGROUND OF THE INVENTION

With reference to FIG. 1, the general architecture is recalled of a cellular mobile radiocommunications system such as, in particular, the Global System for Mobile communications (GSM). Such a system essentially comprises:

a plurality base stations or "Base Transceiver Stations" ("BTSs"), such as those referenced BTS1, BTS2, BTS3, and BTS4; in the example shown, each of the base stations is assigned to a respective cell, the cells being referenced C1, C2, C3, and C4 (other examples naturally being possible in which the same BTS is assigned to a plurality of cells), and the base stations co-operate with mobile stations, such as MS1, MS2, MS3, MS4, situated in the cells;

a plurality of "Base Station Controllers" ("BSCs"), such as those referenced BSC1 and BSC2, each of the BSCs controlling a respective subset of cells from the point of view of managing the radio resources; in the example shown, the Base Station Controller BSC1 controls the cells C1 and C2, and the Base Station Controller BSC2 controls the cells C3 and C4; and a plurality of "Mobile Switching Centers" ("MSCs"), such as that referenced MSC1, each of the MSCs co-operating with external networks, such as, in particular, Public Switched Telephone Networks (PSTNs) or Integrated Services Digital Networks (ISDNs), and controlling a subset of Base Station Controllers from the point of view of managing calls; in the example shown, the Mobile Switching Center MSC1 controls the Base Station Controllers BSC1 and BSC2.

In such a system, a decision to hand over a call is made by the network on the basis of a certain number of parameters, such as, in particular, the results of measurements taken on radio signals for the current server cell and for cells neighboring the current server cell.

The cell to which the call is to be handed over may be referred to as the "new server cell", and it is more precisely chosen from a set of cells referred to as "candidate cells" (determined by the network from said neighboring cells on the basis of said measurement results) in the following manner.

Firstly a request is made to hand over the call to the best of the candidate cells. When such handover is possible, the best candidate cell constitutes the new server cell. When such handover is not possible, a request is made to hand over the call to the following candidate cell, in the order of preference of candidate cells, and so on.

A candidate cell to which handover is requested may also be referred to as the "target cell".

A target cell to which a requested handover is not possible is also referred to as a "rejected cell". A target cell can be rejected in particular because the mobile station does not succeed in setting up a link with the network in the target cell, or else because no radio resource is available in said target cell, because of traffic overload, or because a testing or maintenance operation is in progress in the target cell, this list naturally not being exhaustive.

When the target cell is controlled by the same BSC as the current server cell (in FIG. 1, this situation corresponds, for example, to handover being requested from cell C1 to cell C2, or from cell C3 to cell C4, such handover also being referred to as "internal handover" or "intra-BSC handover"), the BSC in question is capable, by itself and internally, of determining whether or not handover to the target cell is possible, i.e. whether or not the target cell is a rejected cell, since said BSC manages the radio resources for both of the cells.

When the target cell is controlled by a BSC (referred to as the "target BSC") other than the BSC (referred to as the "current server BSC" or more simply below as the "server BSC") that controls the current server cell (also referred to more simply below as the "server cell"), this situation corresponding for example, in FIG. 1, to a request to hand over a call from one or other of the cells C1 and C2 to one or other of the cells C3 and C4 (such handover also being referred to as "external handover", or "inter-BSC handover"), the server BSC is not capable itself and internally of determining whether or not handover to the target cell is possible, i.e. whether or not the target cell is a rejected cell, and the procedure is then as shown in one or other of FIGS. 2 and 3, namely:

the server BSC, referenced $BSC_s$, firstly sends a handover request message (referenced HO REQ in this example for "handover required") to the MSC;

the MSC in turn sends a message of the same type (referenced HO REQ' in this example for "handover request") to the target BSC, referenced $BSC_c$;

after having determined internally whether or not such a handover to the target cell is possible, i.e. whether or not said target cell is a rejected cell, the target BSC sends to the MSC either, when the target cell is not a rejected cell (FIG. 2), a handover request acknowledgment message (referenced HO REQ ACK in this example) itself containing a handover command message, or else, when the target cell is a rejected cell (FIG. 3), a message indicating that it is impossible to perform handover to said target cell (this message being referenced HO FAIL in this example for "handover failure"); and the MSC in turn sends a message of the same type to the server BSC, namely either a handover command message (referenced HO COMM in this example), or else a message indicating that it is impossible to perform handover to said target cell (this message being referenced HO REJ for "handover request rejected").

As shown in FIGS. 4 and 5, once a handover (or "transfer") $T_1$ from one cell $C_i$ to another cell $C_j$ has actually been performed, it is possible that a request might be made for a handover $T_2$ to a cell $C_k$ that was rejected previously during the handover $T_1$. If the cell $C_k$ was rejected previously, then a handover to it was requested previously, i.e. it was probably one of the best candidate cells, and it is thus normal, in particular if the request for handover $T_2$ is made soon after handover $T_1$, that it reappears as one of the best candidate cells for handover $T_2$, and thus that handover to it is requested once again.

As shown in FIG. 4, when both of the cells $C_i$ and $C_j$ are controlled by the same BSC, referenced $BSC_{ij}$, the BSC is aware of that fact that the cell $C_k$ was rejected during handover $T_1$, and is thus able to decide that, temporarily, a request for such a handover $T_2$ to cell $C_k$ must not be made.

As shown in FIG. 5, when the two cells $C_i$ and $C_j$ are not controlled by the same BSC, the current server BSC, referenced $BSC_j$, is not aware of the fact that cell $C_k$ was rejected during handover $T_1$ (because only the initial server BSC, referenced $BSC_i$, is aware of that fact), and it is thus not able to decide that, temporarily, such a request for handover $T_2$ to cell $C_k$ must not be made.

Thus:

if the cells $C_j$ and $C_k$ are not controlled by the same BSC, then the current server BSC ($BSC_j$) uses the procedure recalled above with reference to FIGS. 2 and 3 to send a handover request to the target BSC (not shown) controlling the cell $C_k$, and it then might receive from the target BSC a message indicating that it is impossible to perform handover to the cell $C_k$. An unnecessary handover request will then have been made, thereby lengthening handover time unnecessarily, and giving rise to unnecessary consumption of transmission resources for the purpose of interchanging the corresponding signalling messages, and thus degrading the quality of service; and if the cells $C_j$ and $C_k$ are controlled by the same BSC, the current server BSC ($BSC_j$) might unnecessarily and internally have to determine whether a handover to the cell $C_k$ is possible, thereby lengthening call handover time unnecessarily, and thus also degrading the quality of service.

OBJECTS AND SUMMARY OF THE INVENTION

A particular object of the present invention is to avoid those drawbacks, i.e. to optimize operation of the network in such cases, and more generally to improve co-operation between entities of the network during inter-cell call handover.

The present invention provides a method of improving co-operation between entities in a cellular mobile radio-communications network, during inter-cell call handover, during which a "new server cell" is chosen from a set of "candidate cells" as being a candidate cell to which a requested handover is possible, candidate cells to which a requested handover is not possible being referred to as "rejected cells", wherein, during "external" call handover, namely when handing over a call from a "current server cell" controlled by a "current server entity" to a "new server cell" controlled by a "new server entity" which is distinct from said current server entity, said new server entity is informed of any previously rejected cells.

Thus, since the new server entity is informed of the previously-rejected cells, it does not attempt unnecessarily to make requests for handover to previously-rejected cells, thereby avoiding the above-mentioned drawbacks.

According to another characteristic, said information as to any previously-rejected cells further includes an indication as to the reason for which the cells were rejected, or as to a lapse of time after which a handover to said previously-rejected cells can, if necessary, be requested again.

Thus, the new server cell is then able to determine the time at which a request can, if necessary, be made again for handover to the previously-rejected cells, thereby making it possible to optimize network operation further.

The present invention also provides a cell control entity for a cellular mobile radiocommunications network, in particular a BSC for a network such as a network of the GSM type, for implementing such a method.

BRIEF DESCRIPTION OF THE DRAWINGS

Other objects and characteristics of the present invention will appear on reading the following description of an embodiment given with reference to the accompanying drawings, in which.

MORE DETAILED DESCRIPTION

The present invention thus relates to a method of improving co-operation between entities in a cellular mobile radio-communications network, during inter-cell call handover, during which a "new server cell" is chosen from a set of "candidate cells" as being a candidate cell towards which a requested handover is possible, candidate cells to which a requested handover is not possible being referred to as "rejected cells".

Figure 5:
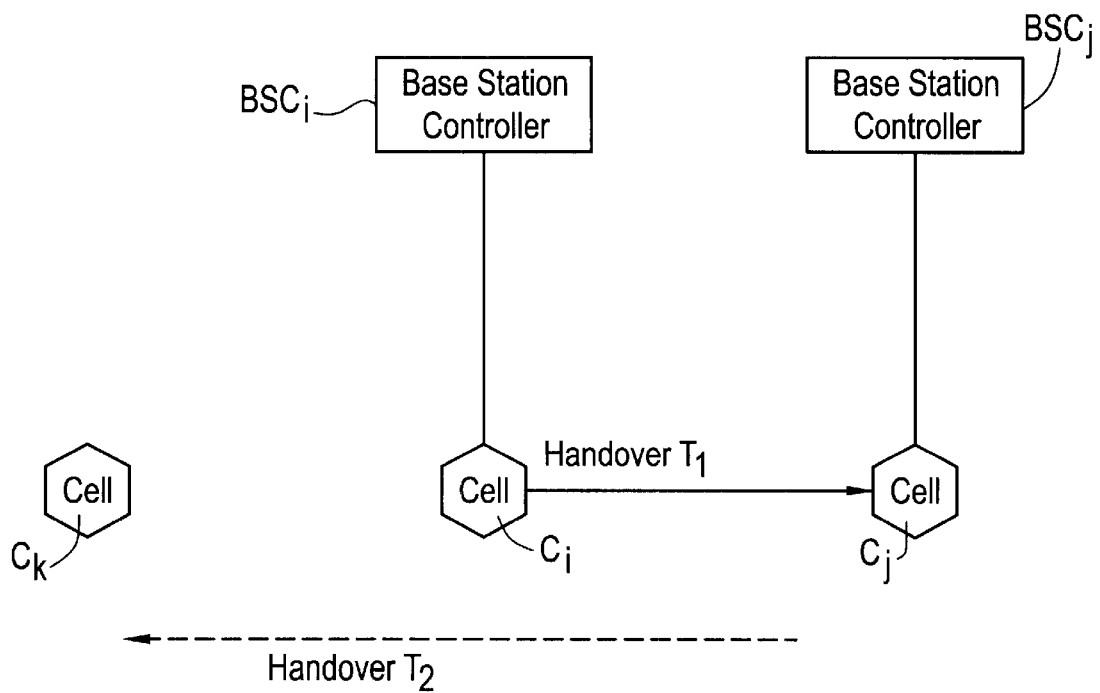

In accordance with the invention, to improve co-operation between entities of the network during "external" call handover, namely handover from a "current server cell" (such as cell $C_i$ shown in FIG. 5) controlled by a "current server entity" of the system (such as entity $BSC_i$ shown in FIG. 5) to a "new server cell" (such as cell $C_j$ shown in FIG. 5) controlled by a control entity that is distinct from said current server entity and that is referred to as the "new server entity" (such as entity $BSC_j$ shown in FIG. 5), said new server entity is informed of any previously rejected cells (such as cell $C_k$ shown in FIG. 5).

For this purpose, in the implementation described with reference to FIGS. 6 and 7, with a candidate cell to which handover is requested being referred to as the "target cell", with the control entity $BSC_c$ for controlling a target cell being referred to as the "target entity", and with each target entity potentially becoming the new server entity if the requested handover to the target cell is possible, each target entity is informed, during a request for handover to the target cell, of any previously-rejected cells.

In addition, in the implementation described with reference to FIGS. 6 and 7, the target entity $BSC_c$ is informed of any previously-rejected cells by the server entity $BSC_s$.

In addition, in the implementation described with reference to FIGS. 6 and 7, the information as to any previously-rejected cells is transmitted from the server entity $BSC_s$ to the target entity $BSC_c$ via the entity MSC (or "higher-level entity") providing the link between the server entity and said target entity.

Figure 1:
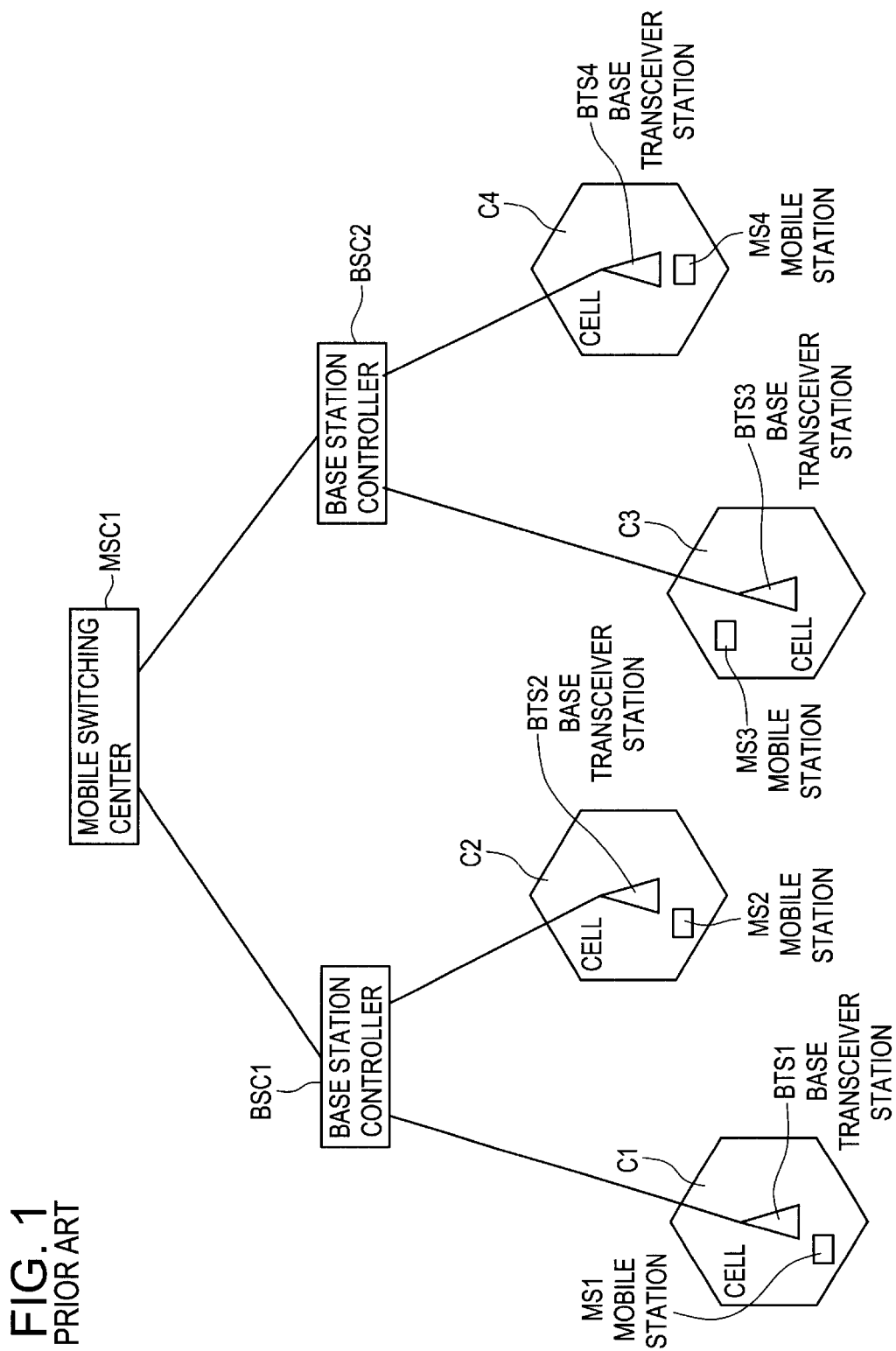
FIG. 1 is a diagram showing the organization of a mobile radiocommunications network such as, in particular, the GSM network.
Figure 2:
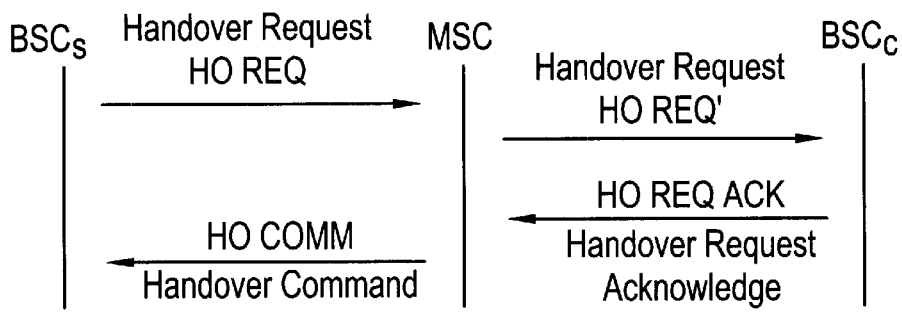
FIG. 2 is a diagram showing the various messages interchanged between various entities of such a network during an external handover request, and when such handover is possible.
Figure 3:
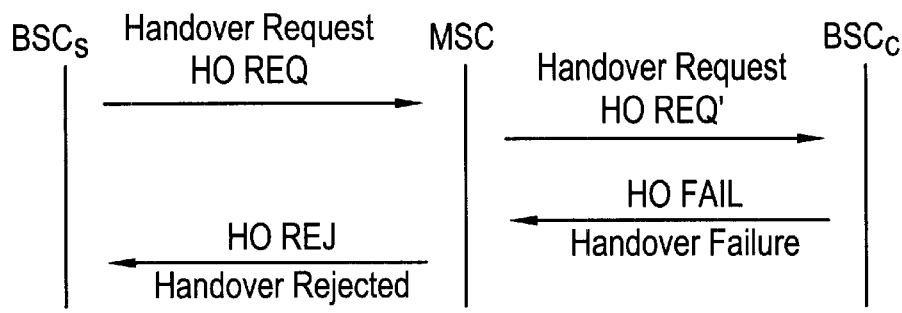
FIG. 3 is a diagram showing the various messages interchanged between various entities of such a network during an external handover request, and when such handover is not possible.
Figure 6:
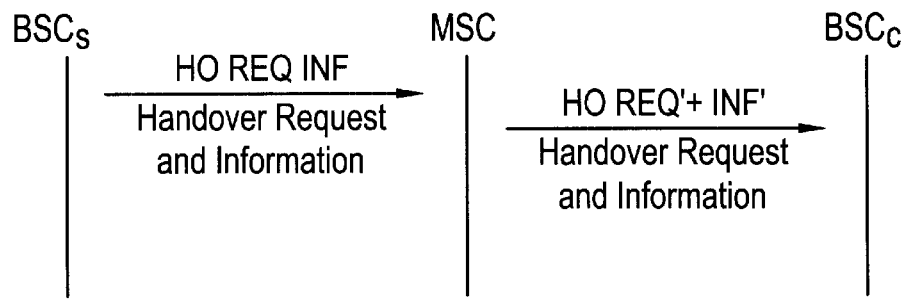
FIG. 6 is a diagram showing an example of a method of the invention for improving co-operation.
Figure 4:
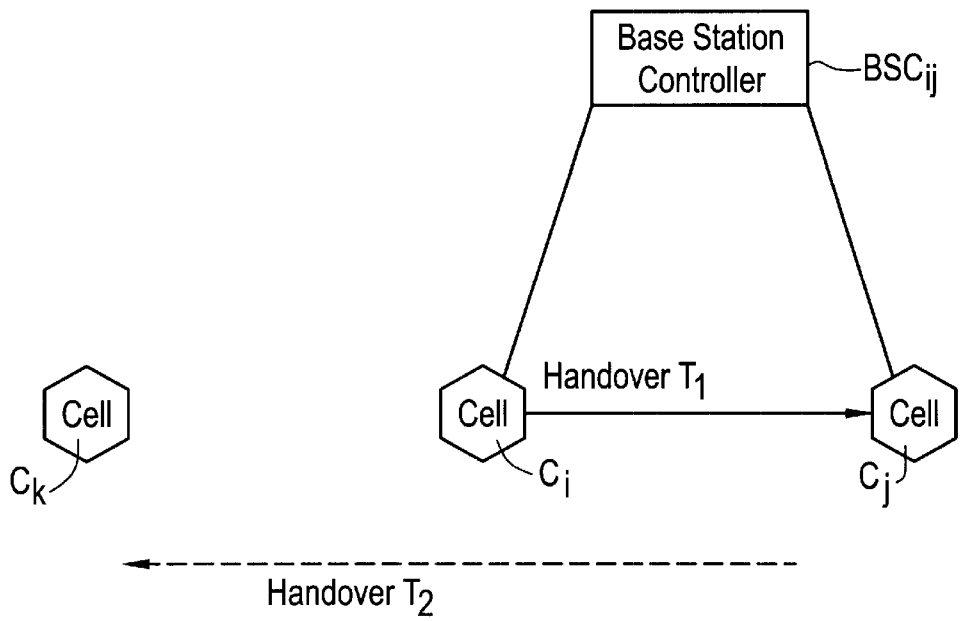
FIGS. 4 and 5 are diagrams showing how the problem is solved by the present invention.

Thus, in the diagram shown in FIG. 6, such information as to any previously-rejected cells (referenced INF) is associated with the message (HO REQ) transmitted to the MSC by the server BSC ($BSC_s$) using the procedure recalled above with reference to FIGS. 2 and 3.

Similarly, the information is re-transmitted by the MSC to the target BSC ($BSC_c$), the information then being referenced INF' and also being associated, in the example shown, with the corresponding message (HO REQ') re-transmitted by the MSC to the target BSC ($BSC_c$).

In another implementation (not shown specifically), it is also possible for each target entity to be informed of any previously-rejected cells by the entity MSC rather than by the current server entity. Such an implementation corresponds, in particular, to the case when the current server entity transmits the list of candidate cells to the MSC, and when the MSC itself successively makes the corresponding handover requests.

Advantageously, the information itself then contains an indication as to the reason for rejecting said cells, or as to a lapse of time after which a handover to said cells can, if necessary, be requested again.

It should also be noted that the previously-rejected cells can be not only cells rejected during the handover in progress, but also cells rejected during preceding handovers, regardless of whether the handovers are internal handovers or external handovers.

Figure 7:
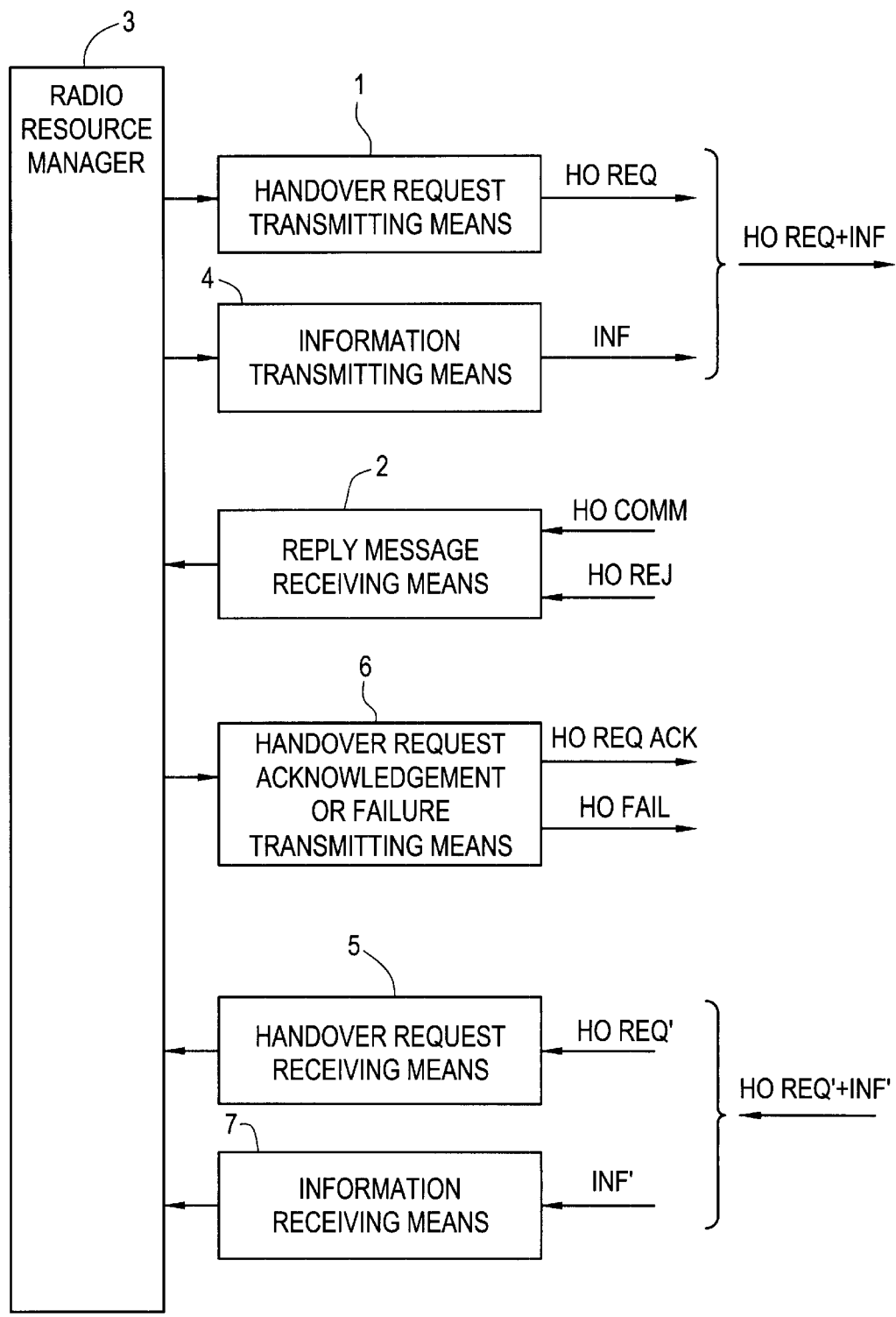
FIG. 7 diagrammatically shows an example of means to be implemented in accordance with the invention in a cell control entity for a cellular mobile radio-communications network (in particular a BSC for a GSM-type network).

FIG. 7 diagrammatically shows the type of means to be used, in an implementation of the invention, in a cell control entity for a cellular mobile radiocommunications network, in particular a BSC for a GSM-type network.

In a manner that is known and therefore not described again in detail herein, for the case when the controlled cell is constituted by a server cell, such an entity BSC includes means 1 for transmitting a handover request message (HO REQ message) requesting handover to a target cell, and means 2 for receiving messages obtained in reply to such a request (HO COMM and HO REJ messages), these means 1 and 2 operating in known manner in association with means 3 for managing radio resources.

In the example shown, for the case when the controlled cell is constituted by a server cell, the entity BSC further includes means 4 for transmitting information INF as to any previously-rejected cells. In the example shown, this information INF is transmitted in association with the handover request message HO REQ.

For this purpose, the means 4 receive information issued by the means 3 for managing radio resources and as to the list of cells rejected during a handover in progress, and they put the information they receive in a form suitable for it to be transmitted to the entity MSC, so as to constitute the information INF.

Optionally, cells rejected during preceding handovers, regardless of whether they were external handovers or internal handovers, may be added to the list in a way which is described below.

Furthermore, the information INF may itself include an indication as to the reason for rejecting the cells in question, or as to a lapse of time after which a handover to said cells can, if necessary, be requested again. As discussed above, a cell can be rejected for example because it is impossible for the mobile station to set up a link with the network in the cell, or because of traffic overload in said cell, or else because a testing or maintenance operation is in progress in the cell, these examples naturally not being limiting.

Also in a manner chat is known and therefore not described again in detail herein, and for the case when the controlled cell is constituted by a target cell, such an entity BSC includes means 5 for receiving handover request messages (HO REQ' messages) and means 6 for transmitting either a handover request acknowledgment message (HO REQ ACK message), or a message indicating that it is impossible to perform handover to said target cell (HO FAIL message), these means 5 and 6 operating, also in known manner, in association with the means 3 for managing radio resources.

In the example shown, and for the case when the controlled cell is constituted by a target cell, the entity BSC further includes means 7 for receiving information such as INF' as to any previously-rejected cells. In the example shown, this information INF' is received in association with the handover request message HO REQ'.

The means 3 for managing radio resources are controlled by the means 7 in a manner such that, when the controlled cell is constituted by a cell that is successively a target cell and then a server cell, the means 1 are prevented from transmitting requests for handover to such previously-rejected cells.

Furthermore, when said information INF' includes an indication relating to the reason for rejecting the cells in question, or to a lapse of time after which handover to said cells can, if necessary, be requested again, the means 3 for managing radio resources are further controlled by the means 7 so as to authorize transmission of such requests for handover to said cells after such a lapse of time or after a lapse of time (e.g. a predetermined lapse of time) which is a function of said reason.

When the rejected cells can be not only cells rejected during the handover in progress, but also cells rejected during preceding handovers, the list of such cells rejected during preceding handovers, as obtained by the means 7 on the basis of the corresponding information INF', is added by the means 3 for managing radio resources to the list of cells rejected during the handover in progress.

The means 1 for transmitting handover request messages (REQ messages), the means 2 for receiving is messages obtained in reply to such a request (HO REJ and HO COMM messages), the means 5 for receiving handover request messages (HO REQ' messages), the means 6 for transmitting either a handover request acknowledgment message (HO REQ ACK message) or a message indicating that it is impossible to perform handover to a target cell (HO FAIL message), and, as regards their functions other than those relating to the present invention, the means 3 for managing radio resources may be means that are conventional and that therefore do not need to be described again herein.

The particular manner in which the means 4 for transmitting information INF as to cells previously rejected, in which the means 7 for receiving corresponding information INF', and in which those particular functions of the means 3 for managing radio resources which relate to the present invention are implemented for the purpose of enabling them to operate using the above-described method poses no particular difficulty for the person skilled in the art, and does not therefore need to be specially described either.

It can be understood that the invention is not limited to the above-described examples, and that, more generally, it makes it possible to improve co-operation between entities in a cellular mobile radiocommunications network, during "external" inter-cell call handover.

What is claimed is:

1. A method of improving co-operation between entities in a cellular mobile radio-communications network, during inter-cell call handover, the method comprising when executing an external call handover from a current server cell controlled by a current server entity to a new server cell selected from a plurality of candidate cells and controlled by a new server entity which is distinct from said current server entity, providing to said new server entity information regarding previously rejected cells for which a requested handover was not possible, wherein the information regarding the previous rejected cells includes information identifying the previously rejected cells.

2. A method according to claim 1, wherein said information regarding the previously rejected cells includes information regarding a reason why the requested handover was not possible, or information regarding a time period after which a handover to said previously-rejected cells can be requested again.

3. A method according to claim 1, wherein said step of providing to said new server entity information regarding previously rejected cells comprises selecting one of said candidate cells as a target cell and transmitting to a target entity which controls the target cell a handover request and information regarding the previously-rejected cells.

4. A method according to claim 3, wherein said information regarding said previously-rejected cells is transmitted by the current server entity to the target entity via a higher-level entity which provides a link between the current server entity and the target entity.

5. A cell control entity for controlling a server cell in a cellular mobile radio-communications network, the cell control entity comprising:

means for receiving a handover request for executing a call handover from a current server cell to the server cell controlled by the cell control entity and information regarding previously-rejected candidate cells for which a requested handover was not possible;

means for transmitting, along with a handover request for executing a call handover from the server cell controlled by the cell control entity to a target server cell, information regarding previously-rejected cells for which a requested handover from the server cell was not possible; and means for preventing transmission of handover requests for executing a handover from the server cell to previously-rejected cells for which a requested handover was not possible, wherein the information regarding- previously-rejected candidate cells includes information identifying the previously-rejected candidate cells.

6. A cell control entity according to claim 5, wherein said information regarding the previously rejected cells includes information regarding a reason why a requested handover to the previously rejected cells was not possible, or information regarding a time period after which a handover to said previously-rejected cells can be requested again, and the cell control entity further comprises means for authorizing transmission of a request for handover to one of said previously-rejected cells after said time period has lapsed, or after a lapse of time that is a function of the reason why the requested handover to the one of the previously rejected cells was not possible.

* * * * *